United States Patent [19]
Watanabe et al.

[11] 3,871,305
[45] Mar. 18, 1975

[54] APPARATUS FOR USE IN QUENCHING AND ABSORBING GAS EMANATING FROM A WASTE INCINERATOR

[75] Inventors: Tetsuya Watanabe; Noboru Suzuki, both of Iwaki, Japan

[73] Assignee: Kureha Kagaku Kogyo Kabushiki Kaisha, Tokyo, Japan

[22] Filed: June 20, 1973

[21] Appl. No.: 371,607

[30] Foreign Application Priority Data
June 22, 1972 Japan.............................. 47-73045
May 9, 1973 Japan.............................. 48-50651

[52] U.S. Cl................ 110/119, 55/223, 55/241, 55/267, 55/355, 261/112, 55/220
[51] Int. Cl.................. F23j 15/00, B01d 47/00
[58] Field of Search.......... 55/220, 223, 240, 355, 55/435, 267, 268, 269, 241, 71; 261/112, 115, 116, 117, 118, DIG. 54; 110/119

[56] References Cited
UNITED STATES PATENTS
1,691,971  11/1928  Hansard et al...................... 55/223
1,743,344  1/1930  Hawley................................ 55/267
3,353,803  11/1967  Wechselblatt et al. ....... 261/DIG. 54
3,577,709  5/1971  Hoad.................................. 55/435 X
3,660,045  5/1972  Gladu............................. 261/118 X
3,696,590  10/1972  Richmond................. 261/DIG. 54 X OTHER PUBLICATIONS
Combat Corrosive Air with Fume Scrubbers and Tubeaxial Faws, Industrial Plastic Fabricators, Inc., Endicott St., Norwood, Mass., 02062, Primary Examiner—Frank W. Lutter
Assistant Examiner—David L. Lacey
Attorney, Agent, or Firm—Lane, Aitken, Dunner & Ziems

[57] ABSTRACT

An apparatus for use in quenching and absorbing gas emanating from a waste incinerator including a gas inlet pipe and a quenching tower. The gas inlet pipe has an end section of a diameter smaller than that of the quenching tower which is telescoped within the quenching tower to define an annular space. Means are provided to introduce a fluid within the annular space to form a fluid seal between the pipe and the tower and to produce a film flow of fluid on the interior surface of the quenching tower.

12 Claims, 4 Drawing Figures

APPARATUS FOR USE IN QUENCHING AND ABSORBING GAS EMANATING FROM A WASTE INCINERATOR

BACKGROUND OF THE INVENTION

1. Field of the Invention

This invention relates to an apparatus for use in quenching and absorbing a gas emanating from waste being incinerated, and more particularly to an apparatus providing water sprinkling means, film-flow means and water-sealing means, in a quenching tower made of a corrosion-resistant material.

2. Description of the Prior Art

Inflammable wastes often contain a variety of synthetic resins, chlorine-containing materials and/or sulfur-containing materials. When such wastes are incinerated, toxic gases containing, e.g. HCl, HCN, $NO_x$, $SO_2$, etc., are produced together with fine dusts. These toxic gases and dusts must be effectively removed, because these contaminants would otherwise corrode metallic materials in the incineration system and produce atmospheric pollution.

These problems are particularly acute in the case of gases containing HCl. For this reason, it is necessary to use acid resistant materials in locations, such as in the gas-absorption section of an incineration system, where hydrochloric acid is encountered. Conventional acid-resistant materials include, for example, silicon nitride, graphite, porcelain, etc. These conventional materials, however, are not only costly but also present problems in maintenance. Their use is not practical, particularly from the viewpoint of economics, because an incineration system, by its nature, does not lead to enhanced productivity or direct profit. On the other hand, synthetic resins are resistant to acids and relatively inexpensive, but have certain shortcomings such as low heat resistance.

Accordingly, there exists a need in the art for a gas quenching apparatus which has a body made of a synthetic resin or the equivalent, and which solves the problem of providing adequate heat resistance.

SUMMARY OF THE INVENTION

It has now been found that the foregoing problems can be effectively overcome by the apparatus of the present invention which provides for quenching and absorbing a gas produced from a waste being incinerated. The apparatus includes a gas introduction pipe and a vertical quenching tower substantially cylindrical in shape which is adapted to receive therein the lower end portion of the gas introduction pipe. The lower end portion of the gas introduction pipe contains a water sprinkling means located above the upper end of the quenching tower. A ceiling cover in the form of an inverted cup is provided over the top of the quenching tower but below the water sprinkling means. The ceiling cover has a vertical skirt provided with at least one hole located near its lower extremety. The apparatus further includes a water sink in the form of an upright cup which surrounds the ceiling cover and which is mounted near the upper end of the quenching tower.

The top end of the vertical cylindrical portion of the water sink extends above the ceiling cover and above the top circumferential edge of the quenching tower. Thus, the present apparatus provides a water seal between the gas introduction tube and the quenching tower in the form of an inverted cup, the ceiling cover, within an upright cup, the water sink. By virtue of the present design, when the level of water in the water sink rises above the top circumferential edge of the quenching tower, the overflowing water creates film flow along and over the inner wall of the quenching tower, thus protecting the quenching tower from the heat of the incineration gas and cooling and absorbing the incineration gas. The gas from the incinerator is further cooled prior to reaching the interior of the quenching tower by means of a water spray located within the gas introduction pipe.

The present invention allows the body of the quenching tower to be fabricated of or lined with an acid resistant material which has a relatively low heat resistance, such as a synthetic resin or the equivalent.

According to another aspect of the present invention, a second water sprinkling means is provided outside of and around the lower end portion of the gas introduction pipe but at a position above the ceiling cover, so that water from the second or exterior sprinkling means cools, not only the exterior of the gas introduction pipe, but also the exterior of the ceiling cover. The second water spray may be utilized as the supply for the sealing water within the water sink and that forming the flowing film on the interior of the quenching tower.

Accordingly, it is an object of the invention to provide waste-gas processing apparatus which uses a quenching tower made of a low cost material but providing good acid resistance, and which effectively protects the acid resistant material from high temperatures.

It is a further object of the invention to provide an apparatus of the type described, which can efficiently and effectively cool and absorb the gas emanating from waste being incinerated.

It is a still further object of the invention to provide an apparatus of the type described, which provides for the efficient suction of incineration gas through a quenching tower, for subsequent discharge to the atmosphere.

DETAILED DESCRIPTION OF THE PREFERRED EMBODIMENTS

Figures 1, 4:
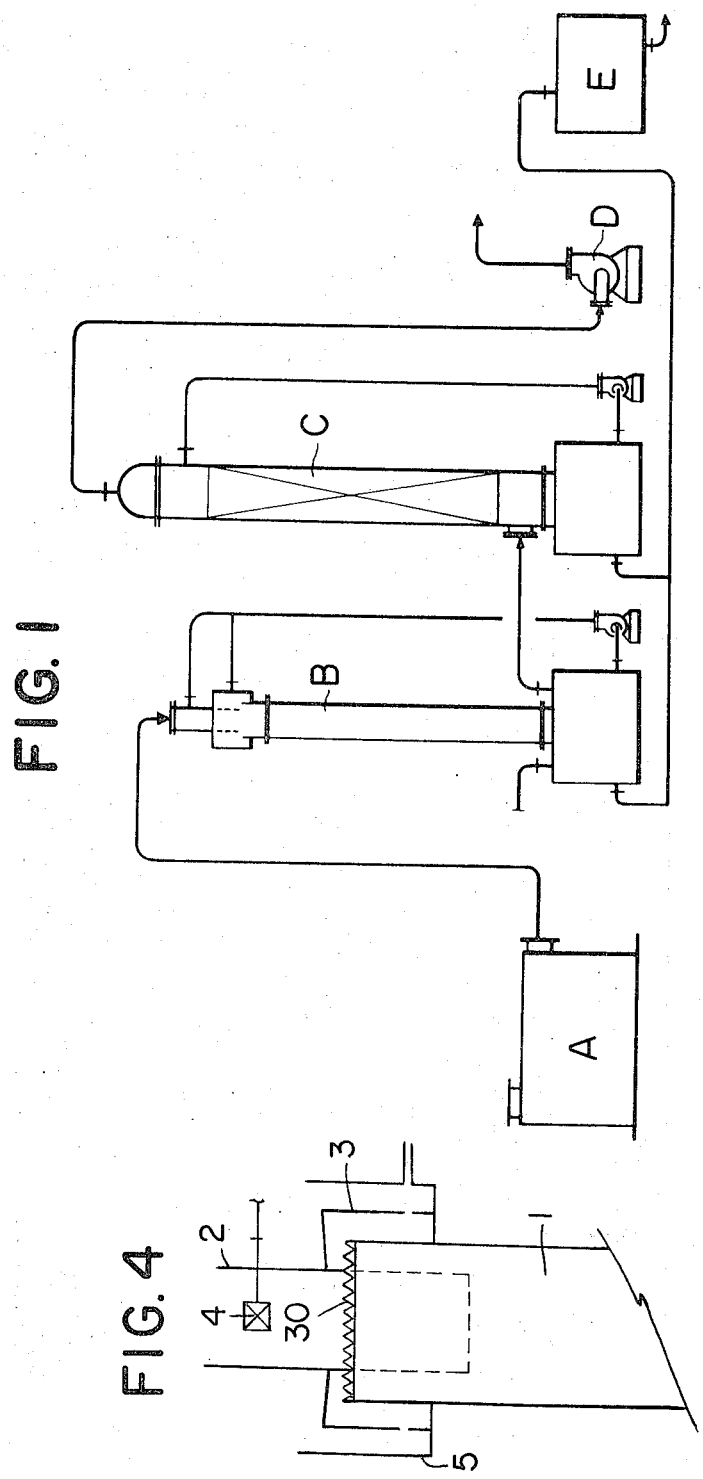
FIG. 1 is a schematic diagram of a waste-incineration system using the apparatus of the present invention.
FIG. 3 is a cross-sectional view of another embodiment of the apparatus of the present invention and FIG. 4 is an embodiment identical to that of FIG. 2 with the exception that a plurality of notches 30 are provided in the upper end portion of the quenching tower 1.

FIG. 1 shows a waste incineration system including an incineration furnace A, a quenching tower B, an absorption tower C, a fan D and neutralization tank E. As indicated by FIG. 1, the gas from the waste being incinerated in the incineration furnace A is drawn by the suction of fan D through the quenching tower B and through absorption tower C (optional), and then discharged to the atmosphere. The water used in the quenching tower B and in the absorption tower C is fed to the neutralization tank E for treatment and recirculation.

Figure 2:
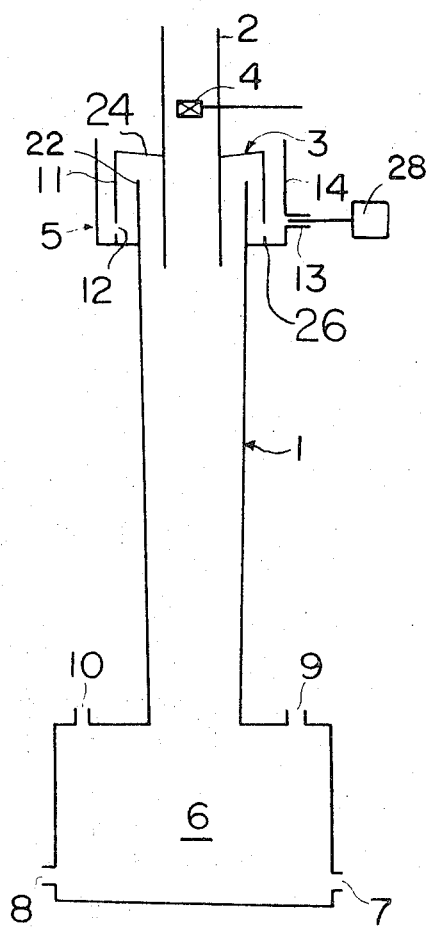
FIG. 2 is a cross-sectional view of one embodiment of the apparatus of the present invention.

Referring to FIG. 2, shown at 1 is a vertical quenching tower having a cylindrical shape. The inner wall of the cylindrical quenching tower is designed to provide for a film flow thereon; thus the configuration of a horizontal cross-section may be circular or any other irregular shape, such as corrugated, so as to increase the contacting area with the gas flowing therethrough. A gas introduction pipe 2 has a lower end portion which extends into the upper end 22 of the quenching tower 1 and contains a water sprinkling means 4. A ceiling cover 3 is mounted on and around the circumference of pipe 2 at a position above and spaced from end 22 of tower 1. The water sprinkling means 4 is located within tower 1 above the ceiling cover 3. The ceiling cover 3 has an annular, generally horizontal top 24 and a circumferential wall or skirt portion 11 extending vertically downward from the annular cover or top 24. The skirt 11 has at least one hole or access opening 12 at a relatively lower position in the skirt 11. The skirt 11 surrounds and is spaced from the upper portion of the quenching tower 1. An annular water sink, generally designated by the numeral 5, has a vertical circumferential wall or skirt 14 surrounding and spaced from the circumferential wall 11 of the ceiling cover 3. The skirt 14 is integral with a generally horizontal annular bottom piece 26 and extends generally perpendicularly upward from the outer periphery thereof. The top edge of the vertical circumferential wall 14 of the water sink 5 is located above the top 24 of ceiling cover 3 and therefore is higher than the top circumferential edge 22 of the quenching tower 1. The annular bottom piece 26 of the water sink 5 is attached and sealed around the outer circumference of the wall of the upper portion of the quenching tower 1. Provided at the vertical circumferential wall 14 of the water sink 5 is an inlet 13 for the water feed. Thus, the circumferential wall 14 surrounds, in turn, the vertical cylindrical wall 11 of the ceiling cover 3 and the upper portion of the quenching tower 1, each in a spaced relationship with the other. The interior of the quenching tower 1 communicates with the atmosphere through a passage defined by the wall members 14 and 11. Water is supplied through the inlet 13 into the water sink 5 and thus flows over the top edge of the quenching tower 1, to form the gas absorption film. The level of the water within the sink 5 can, if necessary, cover the top surface of the ceiling cover 3 for sealing purposes by adjusting the flow rate of water being introduced through the inlet 13 by a flow meter, or the like, shown schematically by the reference numeral 28. The level within sink 5 is also dependent on the area of the opening 12. At the bottom of the quenching tower 1 is an absorption water reservoir 6 which has water exits 7 and 8, a gas exit 9 and a water inlet 10, through which fresh water is supplied.

It should be noted that the seal between the gas introduction pipe 2 and the body of the quenching tower 1 is difficult to achieve, because of the need for different types of materials of construction in the pipe 2 and tower 1, and further because of the high temperature of the gas flowing through the introduction pipe, although the gas is substantially cooled by means provided by the present invention. The effectiveness of the water seal is of great importance, because the gas from the incineration furnace A is transferred by the suction of fan D.

The body of the quenching tower 1 is preferably made of a synthetic resin which serves to prevent corrosion by the gas which contains acidic contaminants. The body of the tower 1 may be of a unitary construction of a synthetic resin alone, or may be of a composite construction in which a metallic material is coated or lined with a synthetic resin or rubber on its inner surface.

Illustrative of the materials which may be employed for the body of the quenching tower of the present invention are various synthetic resins, such as polyvinyl chloride, polyvinylidene fluoride, polyethylene, etc. and synthetic rubbers.

The incineration gas passage leading from the incineration furnace A to the quenching tower 1 may conveniently be of a composite construction, e.g., a pipe lined on its inner surface with bricks of refractory materials such as aluminum oxide, silicon oxide, iron oxide, calcium oxide or magnesium oxide, etc. However, because such materials are not water-proof, the portion of the gas introduction pipe, which is received inside the quenching tower and through which the gas is introduced, together with water from the spray means, should be made of a heat resistant, corrosion-resisting and water-proof material, such as silicon nitride, a ceramic, carbon, etc.

The combined use of the two different types of materials, e.g., silicon nitride or ceramic in the lower portion of the gas introduction pipe and a material such as a synthetic resin or synthetic rubber in the quenching tower body, presents difficulties in attaining a complete seal between the incineration gas pipe 2 and the ceiling cover 3 of the quenching tower 1. Welding is not suitable, nor is the use of putty, because the incineration gas passing through the lower portion of the pipe is too hot for such seals. The water seal previously described is required, because the incineration gas is drawn by the suction of the fan D from the incineration furnace A via quenching tower B and absorption tower C, if the latter is required, and then exhausted to the atmosphere. Thus the presence of a circumferential gap between the incineration-gas introduction pipe 2 and the ceiling cover 3 of the quencher should be avoided because of a possibility of introducing the air from the atmosphere through that gap.

As has been described earlier, according to the present invention the top circumferential edge of the wall 14 of water sink 5 is located vertically above the top surface of the ceiling cover 3, so that the water supplied through inlet 13 may cover the top surface 24 of the ceiling cover 3 to form a water-seal at the aforesaid circumferential gap.

Figure 3:
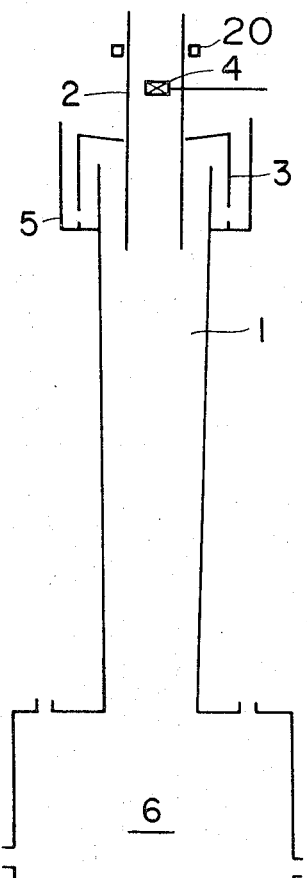

Alternatively, the water seal can be achieved by the second embodiment of the invention, as shown in FIG. 3. In this embodiment, a second or exterior water sprinkling means 20 is provided exterior of and surrounding the incineration-gas introduction pipe 2, and the inlet 13, as shown in FIG. 2, is eliminated. The remainder of the construction of the apparatus is similar to that shown in FIG. 2, and therefore, those parts have not been assigned reference numerals. To improve the water sealing, the ceiling cover 3 in the embodiment of FIG. 3 is constructed with a sloping top surface which slopes radially downwardly and inwardly from the outer circumference as shown at 24 in FIG. 2, and an annular gap is formed between the latter circumference and the inner surface of the cover. Thus, the water flowing from the sprinkling means 20 cools the outer circumferential wall of the lower portion of the gas introduction pipe, and is partly collected in the depression formed on the top surface of the ceiling cover. Part of the water falling onto surface 24 flows through the gap around the pipe 2, and the remainder flows down along the vertical surface 11 of the ceiling cover, is collected in the water sink 5, and then flows through the quenching tower. The overflowing water provides film flow over the surface of the quenching tower. It is understood that the ceiling cover 3 can be mounted relative to the quenching tower in any known manner.

The embodiment of FIG. 4 is identical to that of FIG. 2 with the exception that a plurality of notches 30 are provided in the upper end portion of the quenching tower 1.

In operation, the incineration gas containing toxic gaseous contaminants is introduced into pipe 2 at a temperature ranging from 700° to 900°C. The hot gas is quenched by means of water from the water sprinkling means 4, which also serves to partially absorb the toxic gaseous components and to remove fine dusts. The type of dusts contained in the incineration gas depends on the type of waste and the incinerator conditions. The dusts may be almost completely removed by adjusting the quantity of water emanating from the water sprinkling means 4 and the size of the droplets. The water sprinkling means 4 is preferably located above the ceiling cover 3 within the lower or introducing portion of the pipe 2. The temperature of the incineration gas may be reduced to as low as below 100°C at the exit of the introducing portion of the pipe 2.

It is preferable that the introducing portion of the incineration-gas introducing pipe 2 be cooled on both its inner and outer surfaces. The water sealing provisions, show in FIGS. 2 and 3, are also effective for such cooling.

As previously noted, the water from the sprinkling means 4 also serves to absorb a major portion of the toxic gaseous components, particularly corrosive contaminants such as hydrogen chloride, and to capture and remove fine dusts. For this reason, i.e. the presence of corrosive gases, the quenching tower body of the present invention is preferably made of a synthetic resin or has a synthetic rubber lining. It should be apparent that such materials have low heat resistance but are effectively protected from the heat of the incineration gas by means of a uniform water film flowing over the interior surface of the quenching tower 1. The film flow thus created serves to absorb and remove a further increment of gaseous contaminants and dust fines.

Alternatively, part of the water or solution collected in the water reservoir 6 may be recirculated, by feeding the same back to the inlet 13 (FIG. 2) or into the water sink by an exterior spray (FIG. 3). The excess water or solution is removed through the exit 8 and fed to the neutralization tank, and then discharged. Fresh water is supplied through the inlet 10, as required.

In the manner described above, the incineration-gas may be cooled to as low as below 70°C, while the major portion of the toxic gases contained in the incinerator gas may be absorbed in the water, and the fine dusts also removed therefrom, by the combination of spray and film flow.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for use in quenching and absorbing gas emanating from a waste incinerator, said apparatus comprising a pipe connected to said waste incinerator for receiving said gas, fluid spray means disposed in said pipe, a quenching tower having an open, upper end portion, said pipe having an end portion of a diameter smaller than the diameter of said quenching tower and telescoped within said open end portion of said tower to define an annular space between said telescoping portion, a cover extending from a non-telescoping portion of said pipe and over said open end portion of said tower, a water sink supported by said tower, said sink enclosing said cover and having a portion extending above said cover, means to introduce a fluid into said sink to flow into said annular space, and means for adjusting the flow rate of said fluid into said sink whereby said fluid flows over the interior surface of said tower and submerges said cover to form a fluid seal between said cover and said pipe.

2. The apparatus of claim 1 wherein said pipe is made of carbon, silicon nitride or ceramic.

3. The apparatus of claim 1 wherein said fluid introduction means comprises an inlet opening extending through said sink.

4. The apparatus of claim 1 further comprising water sprinkling means exterior to and surrounding said pipe and positioned above said cover.

5. The apparatus of claim 1 wherein said tower is made of a synthetic resin.

6. The apparatus of claim 1 wherein said tower is lined on its interior surface with a synthetic rubber.

7. The apparatus of claim 1 wherein the horizontal cross-sectional configuration of said tower is circular.

8. The apparatus of claim 1 further comprising a water reservoir beneath said tower to hold water for recirculation to said sink.

9. The apparatus of claim 1 wherein the top edge of said tower has a plurality of notches to produce uniform film flow along and over the interior surface of said tower.

10. The apparatus of claim 1 wherein said cover comprises an annular top portion extending around said pipe, and a vertical cylindrical skirt portion extending downwardly from said top portion and over the upper end portion of said tower in a spaced relation thereto, at least one aperture being formed through said skirt portion.

11. The apparatus of claim 10 wherein said sink comprises a vertical cylindrical wall surrounding and spaced from said skirt portion of said cover, the top edge of said vertical cylindrical wall extending above said top portion of said cover and above the top edge of said tower.

12. The apparatus of claim 10 wherein said annular top portion of said cover is sloped radially downward toward its center to define a depression therein.

* * * * *